United States Patent
Ingemi et al.

(10) Patent No.: US 7,402,921 B2
(45) Date of Patent: Jul. 22, 2008

(54) METHOD AND APPARATUS FOR PROVIDING UNINTERRUPTIBLE POWER

(75) Inventors: Michael Ingemi, Norwood, MA (US); Emanuel Landsman, Lexington, MA (US)

(73) Assignee: American Power Conversion Corporation, West Kingston, RI (US)

( * ) Notice: Subject to any disclaimer, the term of this patent is extended or adjusted under 35 U.S.C. 154(b) by 425 days.

(21) Appl. No.: 11/111,679

(22) Filed: Apr. 21, 2005

(65) Prior Publication Data

US 2006/0238941 A1 Oct. 26, 2006

(51) Int. Cl.
*H02J 7/00* (2006.01)

(52) U.S. Cl. .......................................... 307/64
(58) Field of Classification Search ............... 307/64
See application file for complete search history.

(56) References Cited

U.S. PATENT DOCUMENTS

| | | | |
|---|---|---|---|
| 4,729,081 A | 3/1988 | Nilssen | |
| 4,823,247 A | 4/1989 | Tamoto | |
| 4,827,151 A | 5/1989 | Okado | |
| 4,831,508 A | 5/1989 | Hunter | |
| 4,937,505 A * | 6/1990 | Deglon et al. | ................ 315/307 |
| 4,980,812 A | 12/1990 | Johnson, Jr. et al. | |
| 5,017,800 A | 5/1991 | Divan | |
| 5,126,585 A | 6/1992 | Boys | |
| 5,426,349 A | 6/1995 | Nilssen | |
| 5,519,306 A | 5/1996 | Itoh et al. | |
| 5,654,591 A | 8/1997 | Mabboux et al. | |
| 5,684,686 A * | 11/1997 | Reddy | ......................... 363/97 |
| 6,069,412 A | 5/2000 | Raddi et al. | |
| 7,012,825 B2 | 3/2006 | Nielsen | |
| 2004/0084967 A1 | 5/2004 | Nielsen | |
| 2004/0155526 A1 | 8/2004 | Naden et al. | |
| 2004/0213022 A1 | 10/2004 | Raddi et al. | |

OTHER PUBLICATIONS

International Search Report for PCT/2006/14819 mailed Dec. 20, 2007, 2 pgs.

* cited by examiner

*Primary Examiner*—Robert L. DeBeradinis
(74) *Attorney, Agent, or Firm*—Lowrie, Lando & Anastasi, LLP

(57) ABSTRACT

At least one aspect is directed to an uninterruptible power supply that includes a first input to receive a first input voltage from a first voltage source, a second input to receive a second input voltage from a second voltage source, and a boost circuit coupled to the first input and the second input. The boost circuit is configured to provide a positive output DC voltage and a negative output DC voltage derived from at least one of the first input voltage and the second input voltage. The uninterruptible power supply is configured such that in a back-up mode of operation, the negative output DC voltage is derived from the second input voltage using a circuit that includes at least two controlled switches coupled in series.

38 Claims, 7 Drawing Sheets

METHOD AND APPARATUS FOR PROVIDING UNINTERRUPTIBLE POWER

BACKGROUND OF INVENTION

1. Field of Invention

Embodiments of the invention relate generally to power supplies and more specifically, at least one embodiment relates to a method and apparatus for generating an output voltage derived from an input voltage.

2. Discussion of Related Art

Uninterruptible power supplies (UPS) for providing power to critical loads are well known. FIG. 1 provides a block diagram of a typical on-line UPS 100 that provides regulated power as well as back-up power to a load 140. UPS's similar to that shown in FIG. 1 are available from American Power Conversion (APC) Corporation of West Kingston, R.I. The UPS 100 includes a rectifier/boost converter 110, an inverter 120, a controller 130 and a battery 150. The UPS has inputs 112 and 114 to couple respectively to line and neutral of an input AC power source and has outputs 116 and 118 to provide an output line and neutral to the load 140.

In line mode of operation, under control of the controller, the rectifier/boost converter 110 receives the input AC voltage and provides positive and negative output DC voltages at output lines 120 and 122 with respect to a common line 124. In battery mode of operation, upon loss of input AC power, the rectifier/boost converter 110 generates the DC voltages from the battery 150. The common line 124 may be coupled to the input neutral 114 and the output neutral 118 to provide a continuous neutral through the UPS 100. The inverter 120 receives the DC voltages from the rectifier/boost converter 110 and provides an output AC voltage at lines 116 and 118.

Further details of the rectifier/boost converter 110 and the battery 150 are shown in FIGS. 2A and 2B with FIG. 2A showing the UPS in line mode of operation and FIG. 2B showing the UPS in battery mode of operation. The rectifier/boost converter 110 includes input diodes 160, 162, input capacitors 164, 166, relays 168 and 170, inductors 172 and 174, boost transistors 176 and 178, diode 177, output diodes 180, 182, and output capacitors 184, 186. In addition, the rectifier/boost converter includes a transistor 188 that, as described below functions as part of a buck-boost circuit in the battery mode of operation.

In line mode of operation, relays 168, 170 are configured as shown in FIG. 2A to couple an input AC line voltage at inputs 112, 114 to inductors 172 and 174, such that positive and negative rectified voltages are respectively provided to inductors 172 and 174. Inductor 172 operates in conjunction with transistor 176 and diode 180 as a positive boost circuit under the control of the controller 130 using pulse width modulation to provide a positive DC voltage across capacitor 184. Similarly, inductor 174 operates in conjunction with transistor 178 and diode 182 as a negative boost circuit under the control of the controller 130 using pulse width modulation to provide a negative DC voltage across capacitor 186. The controller may control operation of the boost circuits to provide power factor correction at the input of the uninterruptible power supply, with the input current substantially in phase with the input voltage.

In battery or backup mode of operation, for example, upon failure of the AC voltage source, the relays 168, 170 are moved, under the control of the controller, to the positions shown in FIG. 2B to couple the battery 150 to inductors 172 and 174. In the battery mode of operation, the positive boost circuit operates as discussed above using the battery voltage to generate the DC voltage across capacitor 184. To generate the negative voltage across the capacitor 186 in battery mode, the transistor 188, under the control of the controller, in conjunction with inductor 174 and diode 182 functions as a buck-boost circuit with transistor 188 being cycled off and on. In one version, during each cycle, transistor 178 is turned on immediately prior to transistor 188 being turned on to reduce the voltage across transistor 188 at the time of turn-on to approximately the battery voltage. The drive signal to transistor 178 remains on for the duration of the on time of transistor 188. There is no current flow in transistor 178 due to the fact that the emitter of transistor 178 is at the battery voltage. When transistor 188 is turned off, transistor 178 is again forward biased and the inductor current flows through diode 177 and transistor 178. Transistor 178 stays on for 0.5 microseconds to allow transistor 188 to turn off totally, and is then turned off.

SUMMARY OF INVENTION

At least one aspect of the invention is directed to an improved uninterruptible power supply and method for providing uninterruptible power. The uninterruptible power supply includes a first input to receive a first input voltage from a first voltage source, a second input to receive a second input voltage from a second voltage source, and a boost circuit coupled to the first input and the second input and configured to provide a positive output DC voltage and a negative output DC voltage derived from at least one of the first input voltage and the second input voltage, wherein the uninterruptible power supply is configured such that in a back-up mode of operation, the negative output DC voltage is derived from the second input voltage using a circuit that includes at least two controlled switches coupled in series.

The uninterruptible power supply may further include a control circuit coupled to the boost circuit, wherein the boost circuit includes a positive boost circuit and a negative boost circuit, wherein the control circuit is coupled to the positive boost circuit to control the positive boost circuit to generate the positive DC output voltage in a line mode of operation from at least the first input voltage, and wherein the control circuit is coupled to the negative boost circuit to control the negative boost circuit to generate the negative DC output voltage in the line mode of operation from at least the first input voltage. The at least two controlled switches may include a first controlled switch that forms a part of the negative boost circuit, and a second controlled switch coupled to the control circuit, the second input and to the negative boost circuit and configured such that in the back-up mode of operation, a current path is formed through the first controlled switch and the second controlled switch. The uninterruptible power supply may further include a third input to couple to a ground connection of at least one of the first voltage source and the second voltage source. The negative boost circuit may include a first diode coupled between the third input and a first node of the first controlled switch, an inductor having a first node and a second node with the second node coupled to a second node of the first controlled switch, and a second diode coupled to the second node of the first controlled switch. The second controlled switch may have a first node coupled to the second input and a second node coupled to the first node of the first controlled switch. The uninterruptible power supply may further include the second voltage source, and the second voltage source may include a battery coupled between the second input and the third input. The uninterruptible power supply may further include a first switching circuit coupled to the control circuit and operative to selectively couple an input of the positive boost circuit to one of the first input and the second input, and a second switching circuit coupled to the control circuit and operative to selectively couple the second node of the inductor to one of the first input and the third input. The uninterruptible power supply may further include an inverter coupled to outputs of the boost circuit, coupled to the third input and operative to generate an output AC voltage at first and second output nodes derived from the positive DC voltage and the negative DC voltage. The uninterruptible power supply may be configured to provide an uninterrupted neutral connection from the third input to the second output node, and each of the positive boost circuit and the negative boost circuit may be controlled to provide power factor correction. Each of the first controlled switch and the second controlled switch includes a transistor.

Another aspect of the invention is directed to a method of generating an output voltage from at least one of a first input voltage source providing a primary voltage and a secondary input voltage source providing a back-up voltage. The method includes in a line mode of operation, generating a positive DC voltage and a negative DC voltage derived from at least the primary voltage; and in a back-up mode of operation, generating a positive DC voltage and a negative DC voltage derived from at least the back-up voltage, wherein in the back-up mode of operation, the negative DC voltage is generated using a plurality of controlled switches operatively coupled in series to create a current path from the secondary input voltage source through each of the plurality of controlled switches.

The method may further include controlling each of the plurality of controlled switches using pulse width modulation, such that while in back-up mode of operation each of the plurality of controlled switches is switched between an off state having an off time and an on state having an on time with a ratio between the on time and the off time controlled to provide a regulated output voltage. In the method, the stage of controlling may include controlling the plurality of controlled switches, such that in back-up mode of operation, voltage across a first one of the controlled switches is not greater than the back-up voltage. The method may further include controlling draw of current from the first input voltage source to provide power factor correction, and converting the positive DC voltage and the negative DC voltage into an output AC voltage in both the line mode of operation and the back-up mode of operation. The method may further include rectifying the primary voltage to provide a positive rectified voltage and a negative rectified voltage. The plurality of controlled switches may include a first transistor and a second transistor.

Still another aspect of the invention is directed to an uninterruptible power supply. The uninterruptible power supply includes a first input to receive a first input voltage from a first voltage source, a second input to receive a second input voltage from a second voltage source, and means for providing a positive output DC voltage and a negative output DC voltage derived from at least one of the first input voltage and the second input voltage, wherein the means for providing is configured such that in a back-up mode of operation, the negative output DC voltage is derived from the second input voltage using a circuit that includes at least two controlled switches coupled in series.

The at least two controlled switches of the uninterruptible power supply may include a first transistor and a second transistor coupled in series, and the means for providing may include means for maintaining a voltage across the first transistor to be less than or equal to the second input voltage. The uninterruptible power supply may further include the second voltage source and the second voltage source may include a battery. The uninterruptible power supply may include means for generating an AC output voltage at an output of the uninterruptible power supply, and an uninterrupted neutral connection from the first input to the output.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
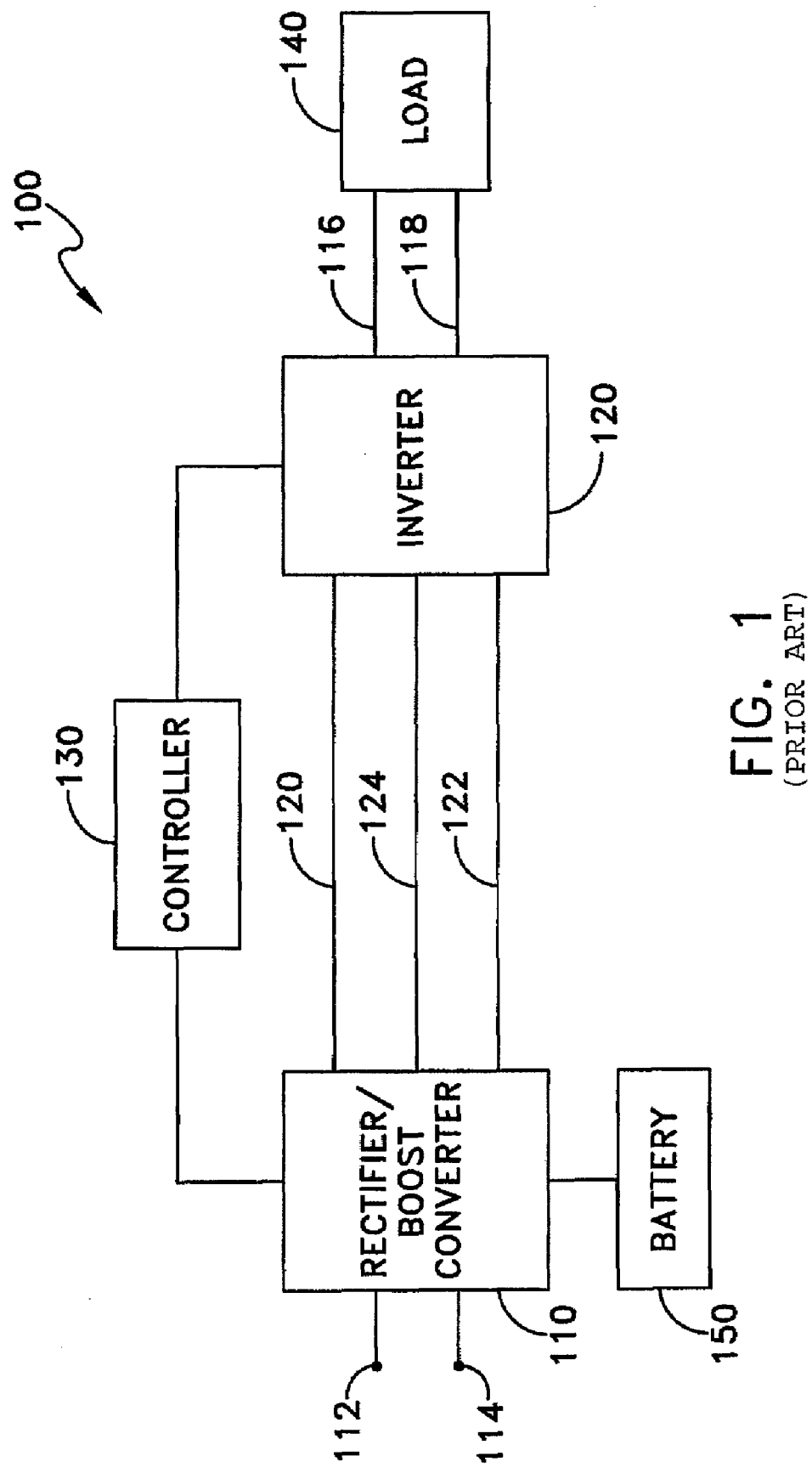
FIG. 1 is a functional block diagram of an uninterruptible power supply.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present invention provides an improved rectifier/boost converter circuit for use, for example, in the uninterruptible power supply of FIG. 1. However, embodiments of the present invention are not limited for use in uninterruptible power supplies, but may be used with other power supplies or other systems generally.

In the rectifier/boost circuit described above with reference to FIGS. 2A and 2B, in battery mode of operation, the voltage across transistor 188 during its "off" state will be approximately equal to the battery voltage plus the absolute value of the negative output voltage. In one system, a 100V battery is used and the output negative voltage is −400 volts, resulting in a voltage of approximately 500 volts across transistor 188. It is desirable to utilize an IGBT for transistor 188. Typically, IGBT's are available with voltage ratings of 600 volts and 1200 volts, and because of tolerances and de-rating requirements, it may become necessary to utilize a 1200 volt IGBT for transistor 188. Higher voltage parts tend to have higher losses, are more expensive and may prevent a design from operating at higher frequencies.

Figure 3A:
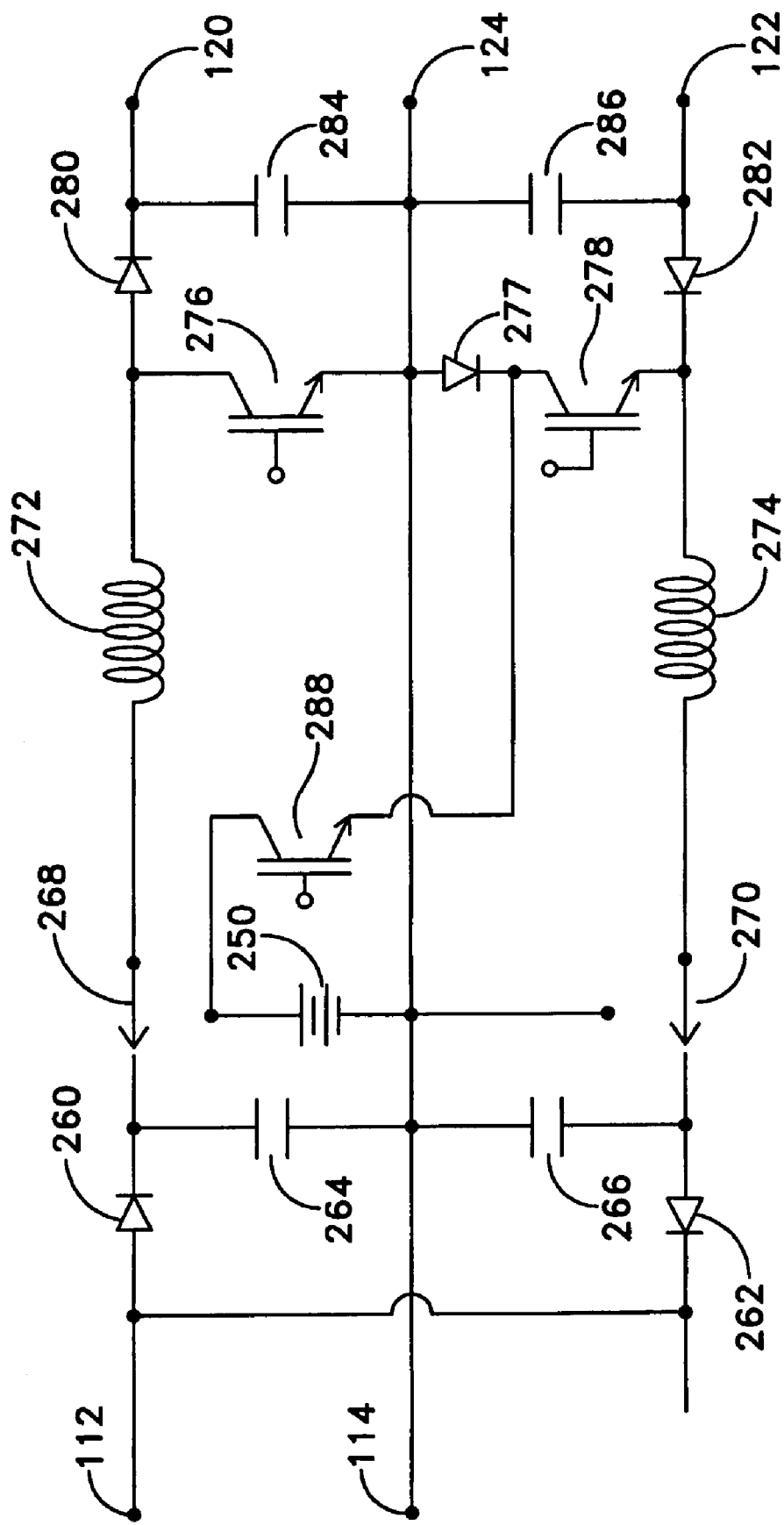
FIG. 3A is a schematic diagram of a rectifier/boost converter in accordance with one embodiment of the invention with the rectifier/boost converter in a first mode of operation.

As will now be described, in at least one embodiment of the present invention, a rectifier/boost converter that may be used, for example, in a UPS, such as that shown in FIG. 1, is configured such that a transistor used in a buck-boost circuit in a back-up mode of operation may be implemented with a lower voltage device. A rectifier/boost converter 210 in accordance with one embodiment of the present invention is shown in FIG. 3A in a line mode of operation and in FIG. 3B in a battery or back-up mode of operation. The rectifier/boost converter 210 includes input diodes 260, 262, input capacitors 264, 266, relays 268 and 270, inductors 272 and 274, boost transistors 276 and 278, diode 277, output diodes 280, 282, and output capacitors 284, 286. In addition, the rectifier boost converter includes a transistor 288 that, as described below functions as part of a buck-boost circuit in the battery mode of operation.

In line mode of operation, relays 268, 270 are configured as shown in FIG. 3A to couple an input AC line voltage at inputs 112, 114 to inductors 272 and 274, such that positive and negative rectified voltages are respectively provided to inductors 272 and 274. Inductor 272 operates in conjunction with transistor 276 and diode 280 as a positive boost circuit under the control of a controller, such as controller 130, using pulse width modulation to provide a positive DC voltage across capacitor 284. Similarly, inductor 274 operates in conjunction with transistor 278 and diode 282 as a negative boost circuit under the control of the controller using pulse width modulation to provide a negative DC voltage across capacitor 286. The controller may control operation of the boost circuits to provide power factor correction at the input of the uninterruptible power supply, with the input current substantially in phase with the input voltage.

Figure 3B:
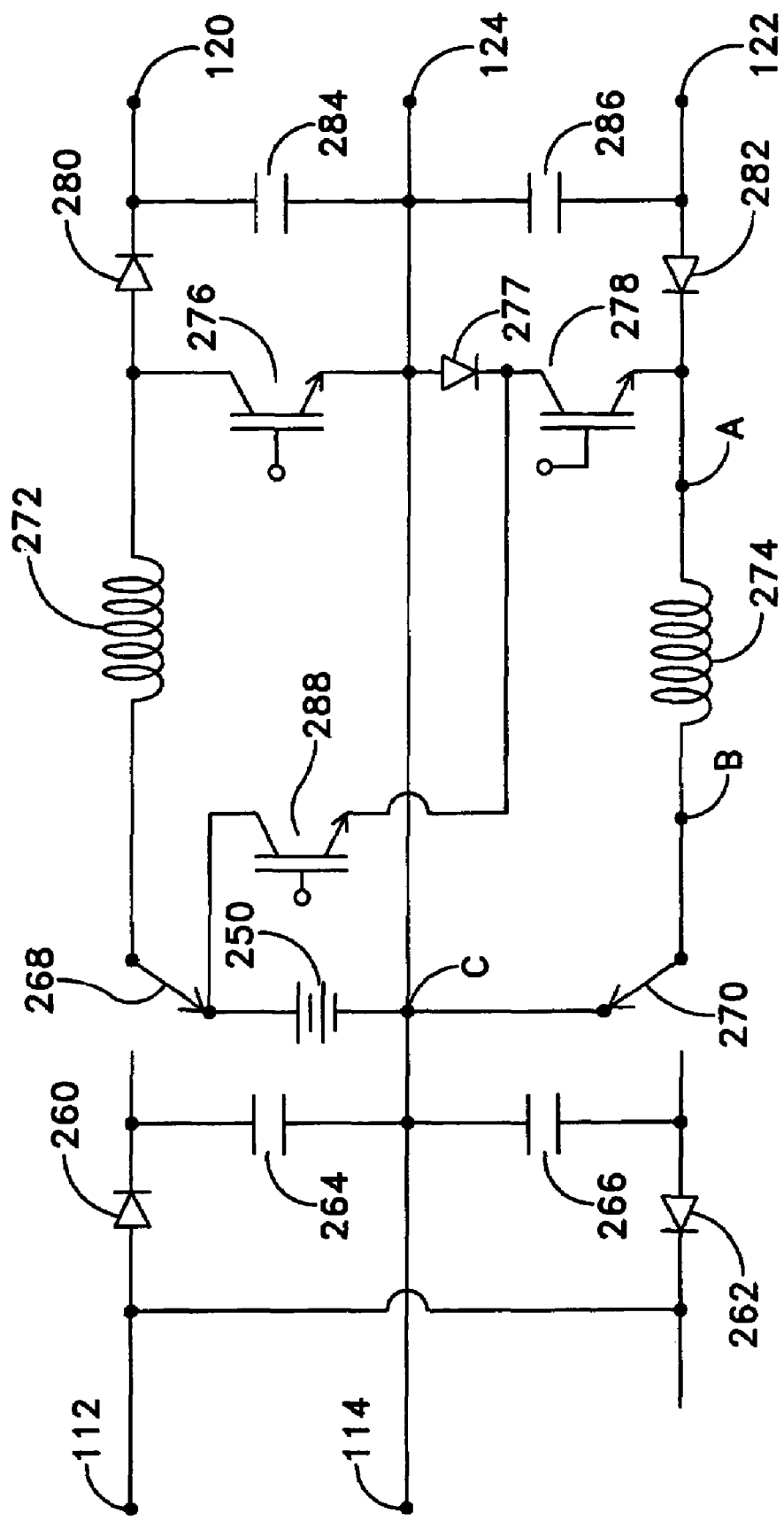
FIG. 3B is a schematic diagram of the rectifier/boost converter of FIG. 3A in a second mode of operation.

In battery or backup mode of operation, for example, upon failure of an AC voltage source, the relays 268, 270 are moved, under the control of the controller, to the positions shown in FIG. 3B to couple the battery 250 to inductors 272 and 274. In the battery mode of operation, the positive boost circuit operates as discussed above using the battery voltage to generate the DC voltage across capacitor 284. To generate the negative voltage across the capacitor 286 in battery mode, the transistors 278 and 288, under the control of the controller, in conjunction with inductor 274 and diode 282 function as a buck-boost circuit with transistor 288 being cycled off and on. In one version, during each cycle, transistor 278 is turned on immediately prior to transistor 288 being turned on and transistor 288 remains on for a short period of time after transistor 278 is turned off.

Figure 2A:
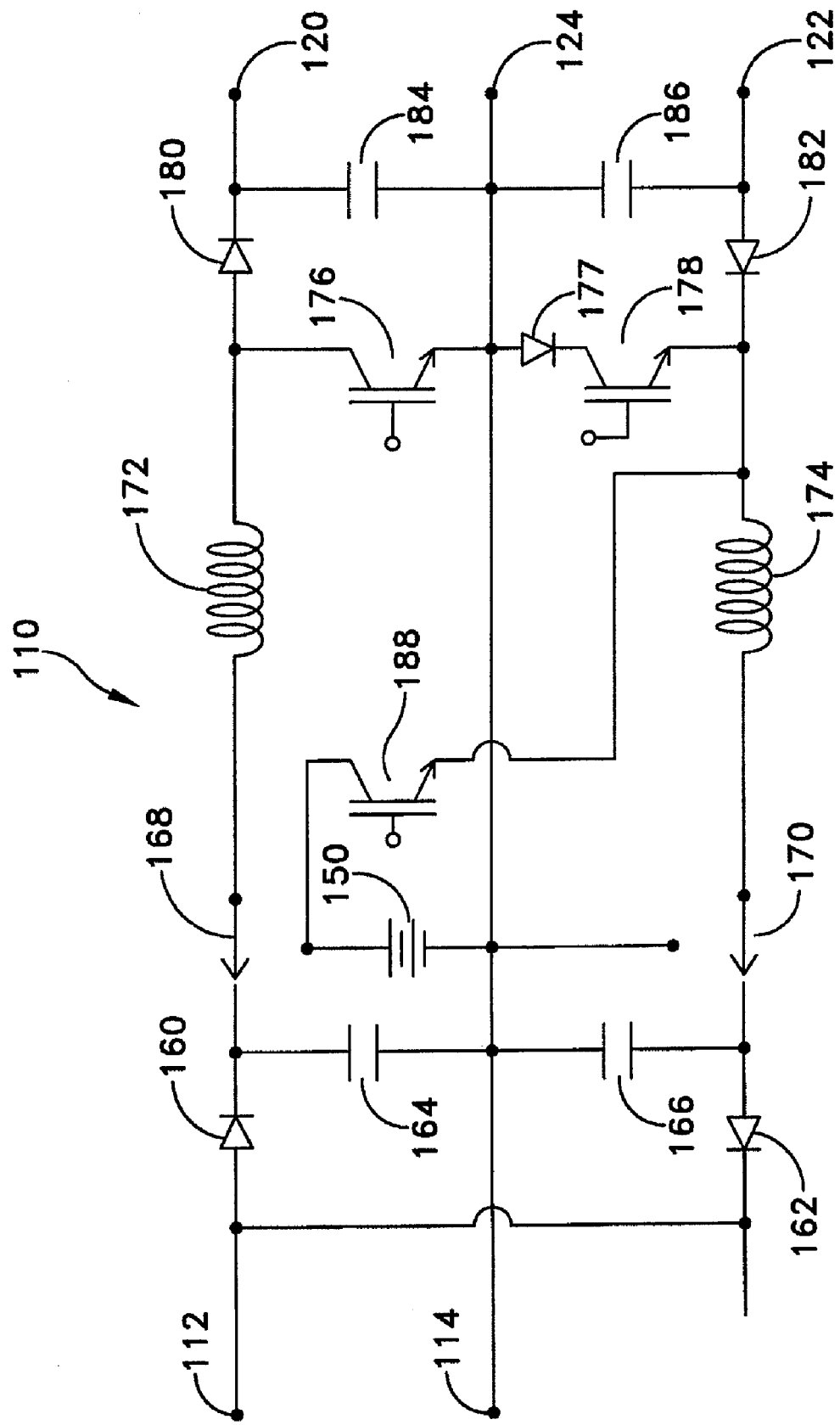
FIG. 2A is a schematic diagram of a prior art rectifier/boost converter used in the uninterruptible power supply of FIG. 1 with the rectifier/boost converter in a first state of operation.
Figure 2B:
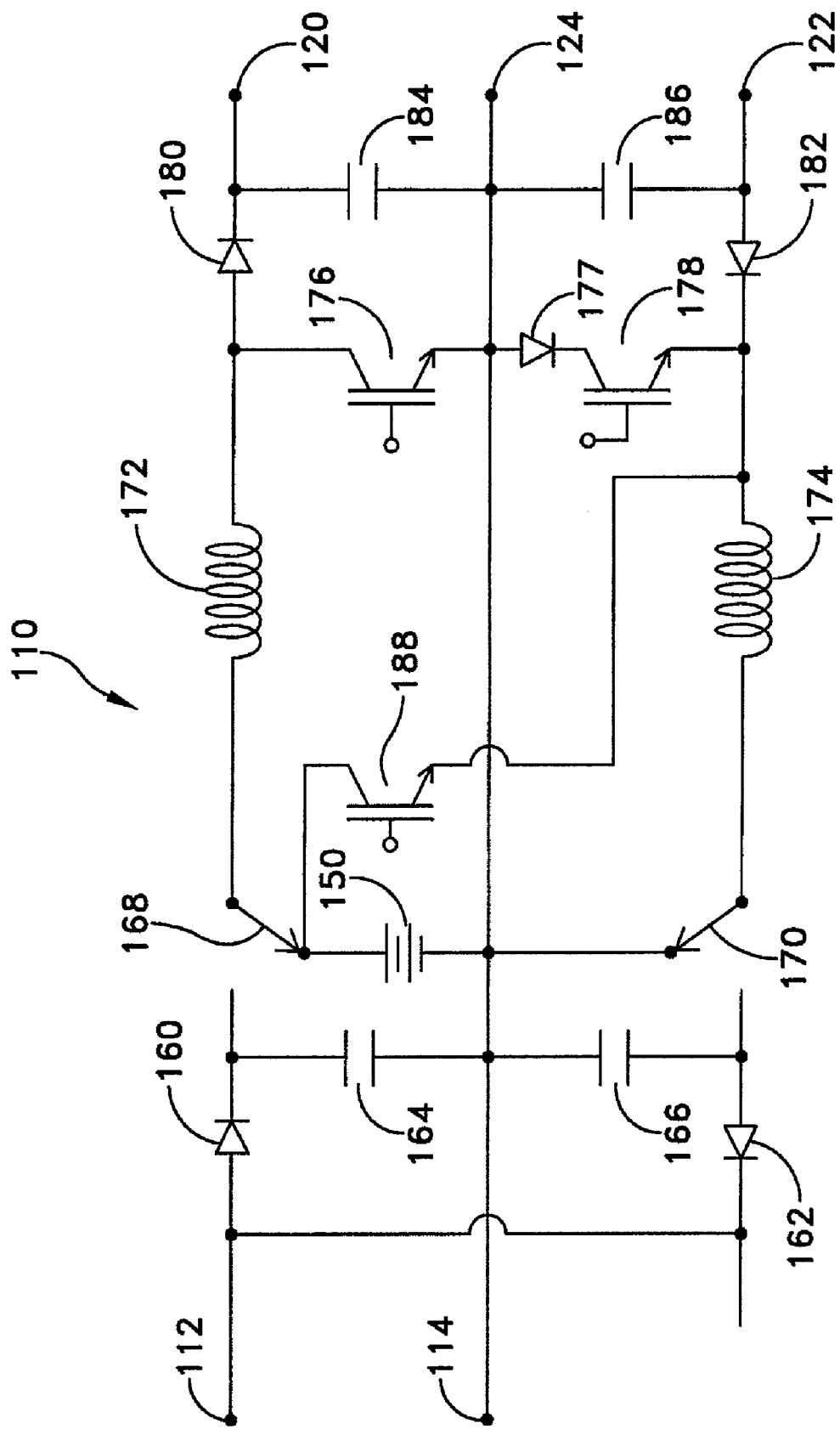
FIG. 2B is a schematic diagram of the rectifier/boost converter of FIG. 2A in a second state of operation.

The rectifier/boost circuit 210 of FIGS. 3A and 3B is similar to the rectifier/boost circuit 110 of FIGS. 2A and 2B with at least one exception. In the circuit 210 the buck-boost transistor 288 is coupled between diode 277 and the negative boost transistor 278, whereas in circuit 110, the buck-boost transistor 188 is coupled between the negative boost inductor 174 and the negative boost diode 182. The coupling of the transistor 288 in converter 210 provides a significant advantage in that it allows a lower voltage IGBT or a low voltage power MOSFET device to be used for transistor 288 for the same battery voltage and negative output voltage, as the voltage across transistor 288 during normal operation of the boost/rectifier converter 210 in the back-up mode does not exceed a value that is substantially equal to the battery voltage.

In one example, which will now be described, a PSPICE simulation was performed and a breadboard was made of the circuit of FIG. 3B with the component values shown in Table 1.

TABLE 1

| Ref. No. | Device | Manufacturer/Part No. | Value |
| --- | --- | --- | --- |
| 260, 262 | Diode | General Semiconductor/GBPC3510 | 35 amp/1000 volt |
| 264, 266 | Capacitor | Illinois Capacitor/106PHC400K | 10 uF/240 vac |
| 250 | Battery | | 100 Volt |
| 272, 274 | Inductor | Falco/T23B16 | 430 uh |
| 276, 278 | IGBT | International Rectifier/IRG4PC40U | 600 volt/20 amp |
| 280 | Diode | International Rectifier/HFA15PB60 | 600 volt/15 amp |
| 282 | Diode | International Rectifier/HFA16PB120 | 1200 volt/16 amp |
| 284, 286 | Capacitor | Cornell Dubiller/400XE1197 | 2200 uf/450 volts |
| 288 | Mosfet | International Rectifier/IRF250 | 200 volt/ |
| 277 | Diode | HFA15PB60 | 600 volt/15 amps |
| 268, 270 | Relays | Hasco/HAT901CSDC | 30 amp/277 vac |

Figure 4A:
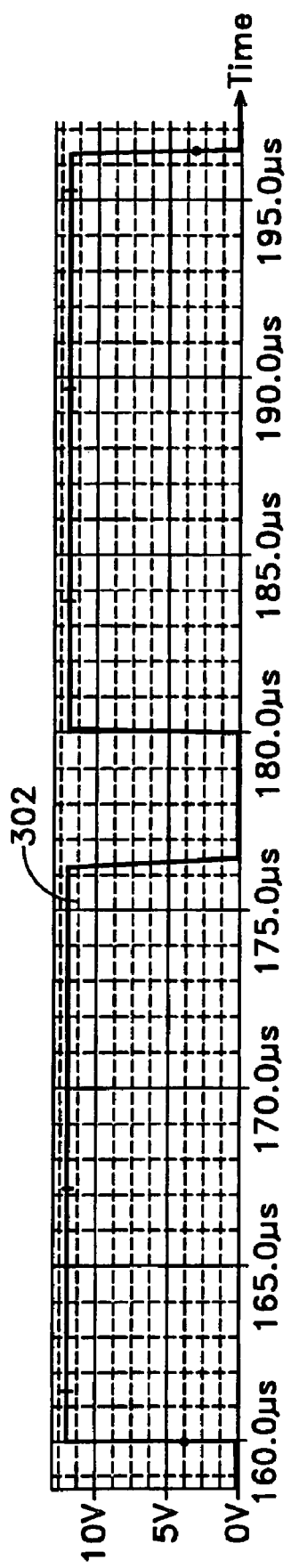
FIG. 4A is a plot of a control voltage waveform applied to a buck-boost transistor of the rectifier/boost converter of FIG. 3B.
Figure 4B:
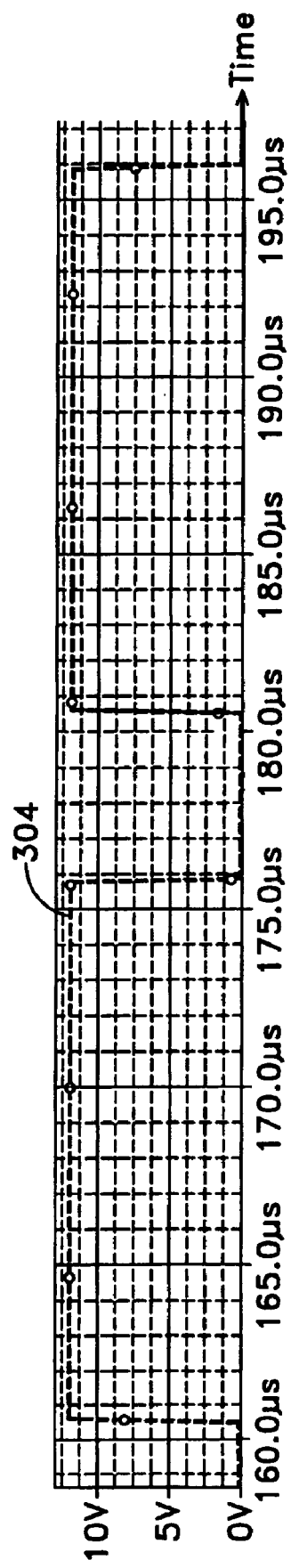
FIG. 4B is a plot of a control voltage waveform applied to a boost transistor of the rectifier/boost converter of FIG. 3B.
Figure 4C:
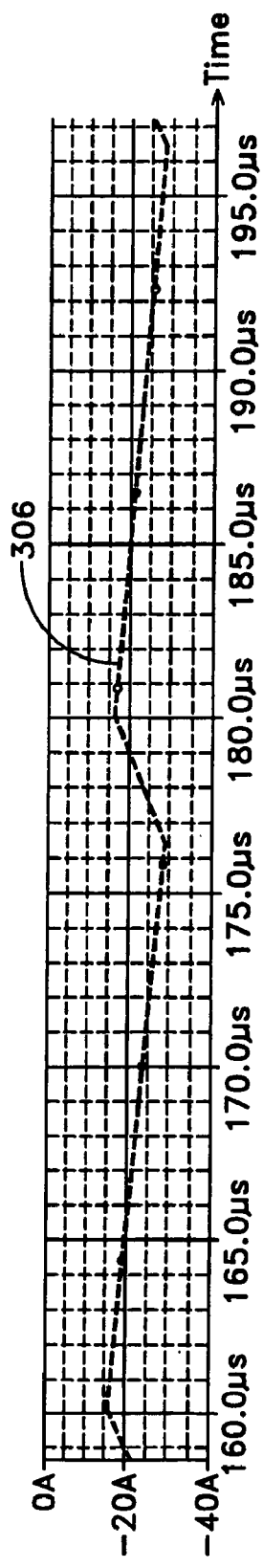
FIG. 4C is a plot of a current waveform through a negative boost inductor of the rectifier/boost converter of FIG. 3B.
Figure 4D:
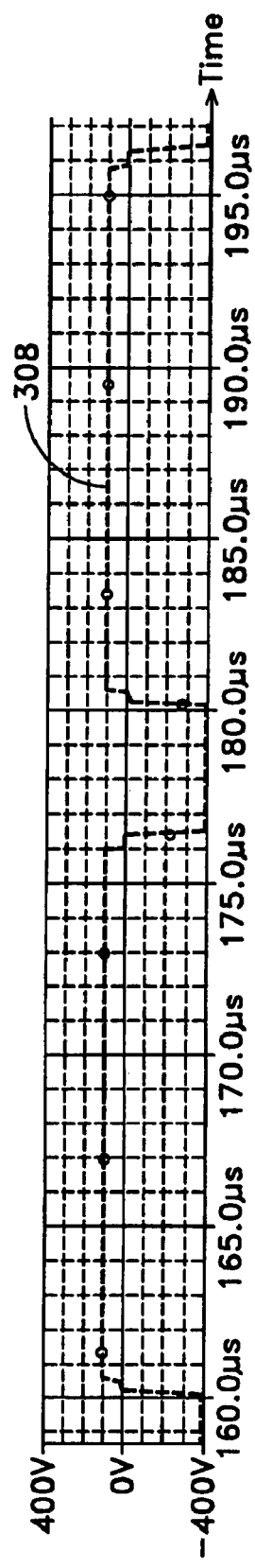
FIG. 4D is a plot of a voltage waveform at a first location in the rectifier/boost converter of FIG. 3B.
Figure 4E:
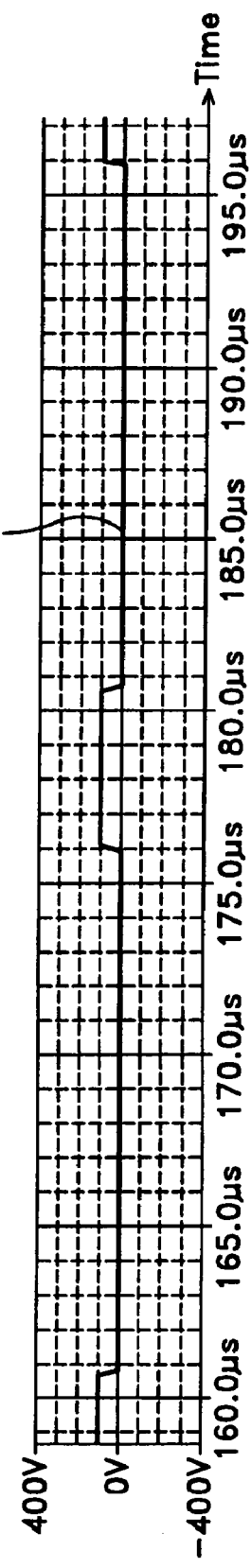
FIG. 4E is a plot of a voltage waveform across the buck-boost transistor of the rectifier/boost converter of FIG. 3B.

The circuit in the simulation included a 100 volt battery and was controlled to provide positive and negative 400 volt output voltages at outputs 120 and 122. FIGS. 4A and 4B provide timing diagrams of control signals 302 and 304 that were respectively applied to the gates of transistors 288 and 278 to control the turning on and off of these devices to provide the buck-boost mode of operation to generate the negative 400 volt output in back-up mode of operation. Each of the transistors is turned on with a high voltage (approximately 11.5 volts) applied to the gate and turned off with a low voltage (approximately 0.0 volts) applied to the gate. FIG. 4C provides a waveform 306 of the current through the inductor in the direction from point B to point A on FIG. 3B, FIG. 4D provides a waveform 308 of the voltage at point A with respect to a common point C, and FIG. 4E provides a waveform 310 of the voltage across transistor 288.

As indicated in FIGS. 4A and 4B, transistors 278 and 288 are controlled such that transistor 278 is turned on approximately 0.5 microseconds before transistor 288 is turned on and transistor 288 is turned off approximately 0.5 microseconds before transistor 278 is turned off. As indicated in FIG. 4C, with both transistors 278 and 288 turned on, the absolute value of the current through inductor 274 increases, and the absolute value of the current decreases when the transistors are turned off. Of particular significance is waveform 310 in FIG. 4E, which indicates that the voltage across transistor 288 never exceeds approximately 100 volts. Accordingly, the buck-boost transistor need not be a high voltage device.

As discussed above, embodiments of the invention provide improved circuits for use in uninterruptible power supplies and other electronic devices, while maintaining advantages of prior art devices. In particular, power factor correction may be provided in embodiments of the invention and an uninterruptible neutral may be provided from an input of a UPS to an output of the UPS.

In embodiments of the invention discussed above, a rectifier/boost converter includes input capacitors and rectifier diodes. As understood by those skilled in the art, the input capacitors 264 and 266 need not be used in all embodiments, and for an input DC voltage, diodes 160 and 162 need not be included. Further, embodiments of the present invention are described as containing relays that are controlled to selectively couple to a primary voltage source or a backup voltage source. In other embodiments devices and switching circuits other than relays may be used including transistors and diodes, and in some embodiments, an uninterruptible power supply may be configured to derive power from both a primary and backup power source at substantially the same time. Embodiments of the invention may be used with single phase primary voltage sources and may also be used with multiphase sources of various voltages.

In describing devices of the invention, circuits and devices are described as having one or more voltage inputs and outputs. Each input and output may include multiple connections for coupling to, for example, respectively a voltage source and a load.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
a first input to receive a first input voltage from a first voltage source;
a second input to receive a second input voltage from a second voltage source; and
a boost circuit coupled to the first input and the second input and configured to provide a positive output DC voltage and a negative output DC voltage derived from at least one of the first input voltage and the second input voltage, wherein the uninterruptible power supply is configured such that in a back-up mode of operation, both the positive output DC voltage and the negative output DC voltage are derived from the second voltage source and the negative output DC voltage is derived from the second input voltage using a circuit that includes at least two controlled switches coupled in series.

2. The uninterruptible power supply of claim 1, further comprising a control circuit coupled to the boost circuit, wherein the boost circuit includes a positive boost circuit and a negative boost circuit, wherein the control circuit is coupled to the positive boost circuit to control the positive boost circuit to generate the positive DC output voltage in a line mode of operation from at least the first input voltage, and wherein the control circuit is coupled to the negative boost circuit to control the negative boost circuit to generate the negative DC output voltage in the line mode of operation from at least the first input voltage.

3. The uninterruptible power supply of claim 2, wherein the at least two controlled switches includes a first controlled switch that forms a part of the negative boost circuit, and a second controlled switch coupled to the control circuit, the second input and to the negative boost circuit and configured such that in the back-up mode of operation, a current path is formed through the first controlled switch and the second controlled switch.

4. The uninterruptible power supply of claim 2, wherein each of the positive boost circuit and the negative boost circuit are controlled to provide power factor correction.

5. The uninterruptible power supply of claim 1, wherein the at least two controlled switches includes a first controlled switch and a second controlled switch, and wherein the uninterruptible power supply further comprises:
a third input to couple to a ground connection of at least one of the first voltage source and the second voltage source; and
a negative boost circuit that includes a first diode coupled between the third input and a first node of the first controlled switch, an inductor having a first node and a second node with the second node coupled to a second node of the first controlled switch, and a second diode coupled to the second node of the first controlled switch;
wherein the second controlled switch has a first node coupled to the second input and a second node coupled to the first node of the first controlled switch.

6. The uninterruptible power supply of claim 5, further comprising: a first switching circuit coupled to a control circuit and operative to selectively couple an input of a positive boost circuit to one of the first input and the second input; and
a second switching circuit coupled to the control circuit and operative to selectively couple the second node of the inductor to one of the first input and the third input.

7. The uninterruptible power supply of claim 1, further comprising an inverter coupled to the boost circuit and operative to generate an output AC voltage at first and second output nodes derived from the positive DC voltage and the negative DC voltage.

8. The uninterruptible power supply of claim 7, wherein the uninterruptible power supply is configured to provide an uninterrupted neutral connection from a third input to the second output node.

9. The uninterruptible power supply of claim 1, wherein each of the at least two controlled switches includes a transistor.

10. The uninterruptible power supply of claim 1, wherein the boost circuit is configured such that in the back-up mode of operation voltage across a first one of the at least two controlled switches is not greater than the second input voltage.

11. An uninterruptible power supply comprising:
a first input to receive a first input voltage from a first voltage source;
a second input to receive a second input voltage from a second voltage source; and
a boost circuit coupled to the first input and the second input and configured to provide a positive output DC voltage and a negative output DC voltage derived from at least one of the first input voltage and the second input voltage, wherein the uninterruptible power supply is configured such that in a back-up mode of operation, the negative output DC voltage is derived from the second input voltage using a circuit that includes at least two controlled switches coupled in series;
a control circuit coupled to the boost circuit, wherein the boost circuit includes a positive boost circuit and a negative boost circuit, wherein the control circuit is coupled to the positive boost circuit to control the positive boost circuit to generate the positive DC output voltage in a line mode of operation from at least the first input voltage, and wherein the control circuit is coupled to the negative boost circuit to control the negative boost circuit to generate the negative DC output voltage in the line mode of operation from at least the first input voltage, wherein the at least two controlled switches includes a first controlled switch that forms a part of the negative boost circuit, and a second controlled switch coupled to the control circuit, the second input and to the negative boost circuit and configured such that in the back-up mode of operation, a current path is formed through the first controlled switch and the second controlled switch; and a third input to couple to a ground connection of at least one of the first voltage source and the second voltage source;

wherein the negative boost circuit includes:

a first diode coupled between the third input and a first node of the first controlled switch;

an inductor having a first node and a second node with the second node coupled to a second node of the first controlled switch; and a second diode coupled to the second node of the first controlled switch; and wherein the second controlled switch has a first node coupled to the second input and a second node coupled to the first node of the first controlled switch.

12. The uninterruptible power supply of claim 11, further comprising the second voltage source and wherein the second voltage source includes a battery coupled between the second input and the third input.

13. The uninterruptible power supply of claim 5, further comprising:

a first switching circuit coupled to the control circuit and operative to selectively couple an input of the positive boost circuit to one of the first input and the second input; and a second switching circuit coupled to the control circuit and operative to selectively couple the Second node of the inductor to one of the first input and the third input.

14. The uninterruptible power supply of claim 13, further comprising an inverter coupled to outputs of the boost circuit, coupled to the third input and operative to generate an output AC voltage at first and second output nodes derived from the positive DC voltage and the negative DC voltage.

15. The uninterruptible power supply of claim 14, wherein the uninterruptible power supply is configured to provide an uninterrupted neutral connection from the third input to the second output node.

16. The uninterruptible power supply of claim 15, wherein each of the positive boost circuit and the negative boost circuit are controlled to provide power factor correction.

17. The uninterruptible power supply of claim 16, wherein each of the first controlled switch and the second controlled switch includes a transistor.

18. An uninterruptible power supply comprising:

a first input to receive a first input voltage from a first voltage source;

a second input to receive a second input voltage from a second voltage source; and a boost circuit coupled to the first input and the second input and configured to provide a positive output DC voltage and a negative output DC voltage derived from at least one of the first input voltage and the second input voltage, wherein the uninterruptible power supply is configured such that in a back-up mode of operation, the negative output DC voltage is derived from the second input voltage using a circuit that includes at least two controlled switches coupled in series wherein the at least two controlled switches includes a first controlled switch and a second controlled switch, and wherein the uninterruptible power supply further comprises;

a third input to couple to a ground connection of at least one of the first voltage source and the second voltage source; and a negative boost circuit that includes a first diode coupled between the third input and a first node of the first controlled switch, an inductor having a first node and a second node with the second node coupled to a second node of the first controlled switch, and a second diode coupled to the second node of the first controlled switch;

wherein the second controlled switch has a first node coupled to the second input and a second node coupled to the first node of the first controlled switch; and further comprising the second voltage source and wherein the second voltage source includes a battery coupled between the second input and the third input.

19. A method of generating an output voltage from at least one of a first input voltage source providing a primary voltage and a secondary input voltage source providing a back-up voltage, the method comprising:

in a line mode of operation, generating a positive DC voltage and a negative DC voltage derived from at least the primary voltage; and in a back-up mode of operation, generating a positive DC voltage and a negative DC voltage derived from the back-up voltage;

wherein in the back-up mode of operation, the negative DC voltage is generated using a plurality of controlled switches operatively coupled in series to create a current path from the secondary input voltage source through each of the plurality of controlled switches.

20. The method of claim 19 further comprising:

controlling each of the plurality of controlled switches using pulse width modulation, such that while in back-up mode of operation each of the plurality of controlled switches is switched between an off state having an off time and an on state having an on time with a ratio between the on time and the off time controlled to provide a regulated output voltage.

21. The method of claim 20, wherein controlling includes controlling the plurality of controlled switches, such that in back-up mode of operation voltage across a first one of the controlled switches is not greater than the back-up voltage.

22. The method of claim 21, further comprising controlling draw of current from the first input voltage source to provide power factor correction.

23. The method of claim 22, further comprising converting the positive DC voltage and the negative DC voltage into an output AC voltage in both the line mode of operation and the back-up mode of operation.

24. The method of claim 23, further comprising rectifying the primary voltage to provide a positive rectified voltage and a negative rectified voltage.

25. The method of claim 24, wherein the plurality of controlled switches includes a first transistor and a second transistor.

26. The method of claim 19, wherein controlling includes controlling the plurality of controlled switches such that in the back-up mode of operation, voltage across a first one of the controlled switches is not greater than the back-up voltage.

27. The method of claim 19, further comprising controlling draw of current from the first input voltage source to provide power factor correction.

28. The method of claim 19, further comprising converting the positive DC voltage and the negative DC voltage into an output AC voltage in both the line mode of operation and the back-up mode of operation.

29. The method of claim 19, further comprising rectifying the primary voltage to provide a positive rectified voltage and a negative rectified voltage.

30. The method of claim 19, wherein the plurality of controlled switches includes a first transistor and a second transistor coupled in series.

31. An uninterruptible power supply comprising:

a first input to receive a first input voltage from a first voltage source;

a second input to receive a second input voltage from a second voltage source; and means for providing a positive output DC voltage and a negative output DC voltage derived from at least one of the first input voltage and the second input voltage, wherein the means for providing is configured such that in a back-up mode of operation, the positive output DC voltage and the negative DC output voltage are derived from the second voltage source, with the negative output DC voltage being derived from the second input voltage using a circuit that includes at least two controlled switches coupled in series.

32. The uninterruptible power supply of claim 31, wherein the at least two controlled switches includes a first transistor and a second transistor coupled in series, and wherein the means for providing includes means for maintaining a voltage across the first transistor to be less than or equal to the second input voltage.

33. The uninterruptible power supply of claim 32, further comprising the second voltage source and wherein the second voltage source includes a battery.

34. The uninterruptible power supply of claim 33, further comprising means for generating an AC output voltage at an output of the uninterruptible power supply.

35. The uninterruptible power supply of claim 34, further comprising an uninterrupted neutral connection from the first input to the output.

36. The uninterruptible power supply of claim 31, further comprising the second voltage source and wherein the second voltage source includes a battery.

37. The uninterruptible power supply of claim 31, further comprising means for generating an AC output voltage at an output of the uninterruptible power supply.

38. The uninterruptible power supply of claim 37, further comprising an uninterrupted neutral connection from the first input to the output.

* * * * *